United States Patent [19]

Fan et al.

[11] Patent Number: 4,731,787
[45] Date of Patent: Mar. 15, 1988

[54] MONOLITHIC PHASEMATCHED LASER HARMONIC GENERATOR

[75] Inventors: Tso Y. Fan; Robert L. Byer, both of Stanford, Calif.

[73] Assignee: Board of Trustees, Stanford University, Stanford, Calif.

[21] Appl. No.: 924,746

[22] Filed: Oct. 30, 1986

Related U.S. Application Data

[63] Continuation-in-part of Ser. No. 896,865, Aug. 15, 1986, which is a continuation-in-part of Ser. No. 674,948, Nov. 26, 1984, abandoned.

[51] Int. Cl.$^4$ ................................................ H01S 3/10
[52] U.S. Cl. .......................................... 372/22; 372/21; 372/71; 372/66
[58] Field of Search ................. 372/22, 21, 27, 69–71, 372/26, 66

[56] References Cited

U.S. PATENT DOCUMENTS

| | | | |
|---|---|---|---|
| 4,181,899 | 1/1980 | Liu | 372/22 |
| 4,617,666 | 10/1986 | Liu | 372/22 |
| 4,618,957 | 10/1986 | Liu | 372/22 |
| 4,637,026 | 1/1987 | Liu | 372/22 |
| 4,653,056 | 3/1987 | Baer et al. | 372/22 |
| 4,656,635 | 4/1987 | Baer et al. | 372/22 |

*Primary Examiner*—Leon Scott, Jr.
*Attorney, Agent, or Firm*—Harry E. Aine

[57] ABSTRACT

A monolithic phasematched harmonic generator is obtained by optically pumping an optically nonlinear lasant member having reflective faces defining the monolithic optical resonator. Phasematching is achieved, in one case, by inclining a totally internally reflective face of the resonator at a proper angle relative to other faces of the resonator to angularly separate and resonate lasant waves of the proper polarization. In a second case, a clad fiber resonator of optically nonlinear lasant material has its cladding arranged to guide and thus resonate only lasant waves of the correct polarization. In a third case, the optical nonlinear coefficient of the optically nonlinear lasant material is spatially modulated with a period equal to an odd integer number of coherence lengths, of the harmonic generation process, to obtain quasi-phasematched operation. Phasematched operation improves the efficiency of the harmonic generation process.

18 Claims, 3 Drawing Figures

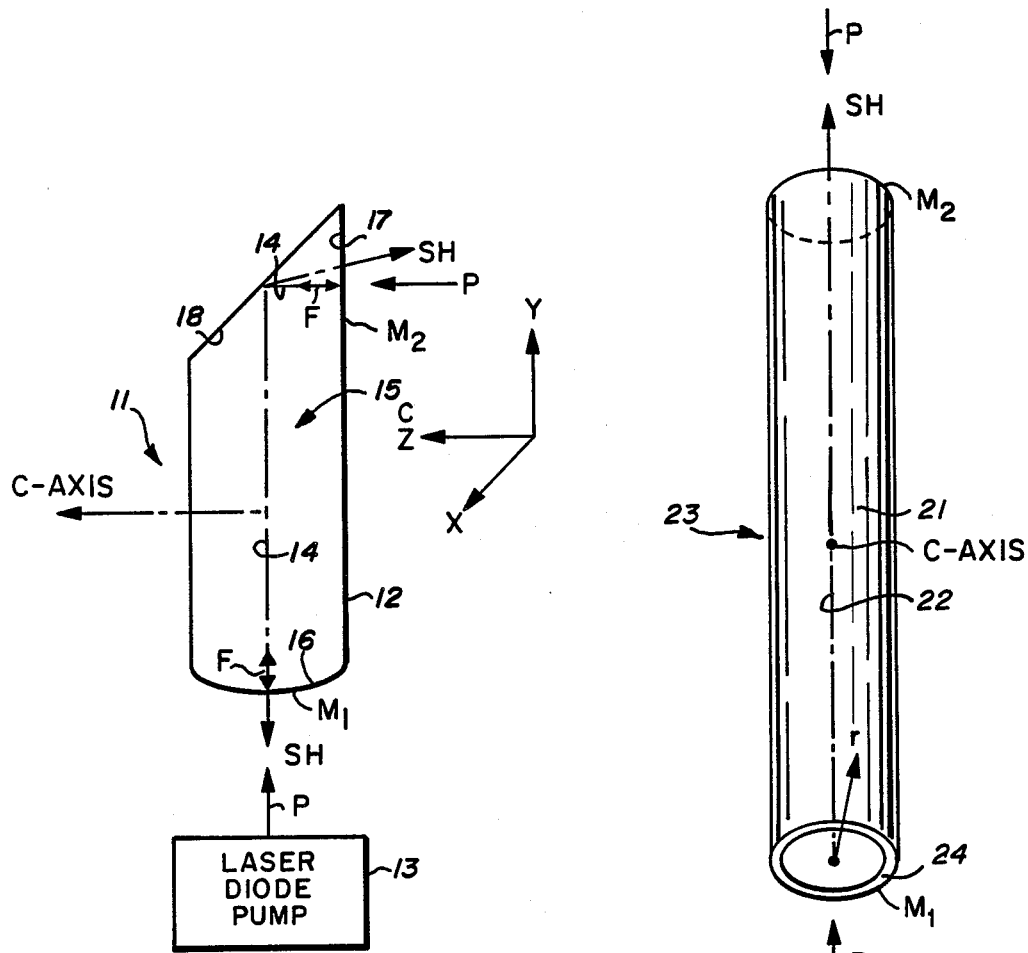
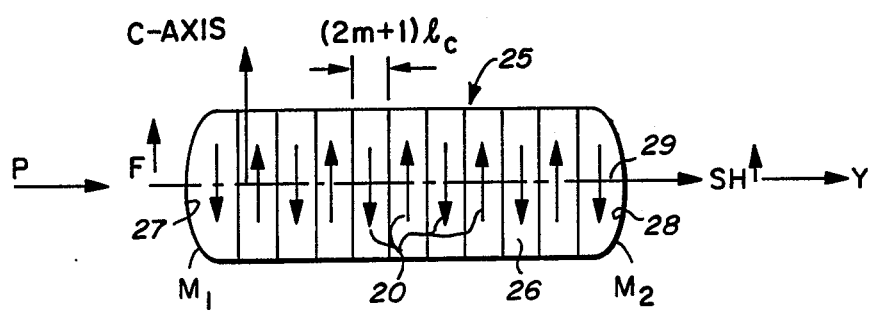

ial such as Nd:LiNbO$_3$. Such self-frequency doubling operation is disclosed in an article appearing in the Soviet Technical Physics Letters, Vol. 4, pg. 590 (1979).

MONOLITHIC PHASEMATCHED LASER HARMONIC GENERATOR

GOVERNMENT CONTRACT

The present invention was made in performance of a U.S. Government Contract with the Office of Naval Research, Contract #N00014-83-K-0449.

RELATED CASES

The present invention is a continuation-in-part invention of co-pending U.S. patent application, U.S. Ser. No. 896,865 filed Aug. 15, 1986, which in turn is a continuation-in-part application of parent application Ser. No. 674,948 filed Nov. 26, 1984, now abandoned.

BACKGROUND OF THE INVENTION

The present invention relates in general to laser harmonic generators and, more particularly, to an improved harmonic generator wherein the reflectors of the optical resonator are formed on a member of optically nonlinear lasant material such that the optical resonator containing the laser gain medium and the nonlinear optical material is a monolithic structure.

DESCRIPTION OF THE PRIOR ART

Heretofore, it has been proposed to obtain usable levels of green radiation by doubling the output of a NPP laser pumped by solid-state, near infrared diodes or laser diodes. The second harmonic generator included an optical resonator consisting of two, 5 cm radius mirrors separated by approximately 20 cms, with a spherical, single-element lens (2.5-cm focal length) placed in the center of the cavity. With this configuration, two small laser mode waists were located at the midpoints between the lens and mirrors. The Nd$^{3+}$ lasant medium, i.e., NdP$_5$O$_{14}$ (Nd pentaphosphate, NNP) and the doubler crystal of Ba$_2$NaNb$_5$O$_{15}$ were placed at the waists. In such an optical resonator, it was demonstrated that second harmonic output at 0.525 microns was obtained with milliwatt pump power levels derived from a dye laser. From these results, it was extrapolated that similar second harmonic generation could be obtained by pumping the NPP crystal with near-infrared pumping radiation derived from semiconductor sources such as light emitting diodes or laser doides. Such a laser is disclosed in an article entitled: "Intracavity second-harmonic generation in a Nd pentaphosphate laser", appearing in Applied Physics Letters, Vol. 29, pgs. 176-179 (1976).

One of the problems encountered in this prior art second harmonic generator was that the optical resonator was relatively large, mechanically and thermally unstable, and costly to manufacture.

It is also known from the prior art to obtain cw 1.5 mW laser output power of $\lambda = 1.06$ microns at room temperature from a miniaturized Nd:YAG laser. In this laser, a super luminescent diode optically end pumped a 3 mm diameter by 5.4 mm laser rod of Nd:YAG material. The pumping radiation derived from the super luminescent diode was focused by a selfoc lens into the Nd:YAG rod having the optical resonator mirrors coated on opposite ends to define a monolithic optical resonator.

Such a laser is disclosed in an article entitled: "Room-temperature cw operation of an efficient miniaturized Nd:YAG laser end pumped by a super luminescent diode", appearing in Applied Physics Letters, Vol. 29, No. 11 of Dec. 1, 1976, pgs. 720–722.

It is also known from the prior art to obtain self-frequency doubling in an optically nonlinear lasant material such as Nd:LiNbO$_3$. Such self-frequency doubling operation is disclosed in an article appearing in the Soviet Technical Physics Letters, Vol. 4, pg. 590 (1979).

It would be desirable if a monolithic intracavity doubled laser, where the mirrors of the laser cavity are coated directly onto the faces of the crystal could be fabricated. Such a doubled laser would have simplified design leading to more inexpensive manufacture, greater mechanical and thermal stability, and lower intracavity losses which leads to higher efficiency. However, a difficulty for monolithic harmonic generators is the desire for harmonic phasematching which requires that the index of refraction at the harmonic be equal to that at the fundamental, i.e., the lasant transition. Due to dispersion, the index of refraction at the harmonic is generally greater than that at the fundamental. However, birefringence in crystals such as LiNbO$_3$ and Ba$_2$NaNb$_5$O$_{15}$ can be used to offset the dispersion and thus achieve phasematching. For phasematching in both LiNbO$_3$ and Ba$_2$NaNb$_5$O$_{15}$ both the direction of propagation and the polarization of the fundamental wave are perpendicular to the crystallographic c-axis. However, when Nd$^{3+}$ is doped into these two crystals, the gain is higher for the polarization of the fundamental parallel to the c-axis. Consequently, to force the laser to operate with the correct polarization, a polarizer is inserted into the cavity, thus making monolithic configurations heretofore impossible.

SUMMARY OF THE PRESENT INVENTION

The principal object of the present invention is the provision of an improved monolithic laser harmonic generator.

In one feature of the present invention, the fundamental wave of the lasant transition and the generated harmonic are phasematched within a monolithic optically nonlinear laser resonator, whereby the efficiency of the harmonic generation process is enhanced in use.

In another feature of the present invention, phasematching is achieved by making one of the faces of the monolithic optical resonator totally internally reflective and orienting that face relative to the other reflective faces of the optical resonator so that orthogonally polarized waves of lasant radiation are reflected from the totally internally reflective face along different paths, only one of which represents a resonant path for the correctly polarized lasant radiation between the reflective faces of the monolithic optical resonator.

In another feature of the present invention, the optically nonlinear lasant material is a fiber of crystalline, birefringent, and uniaxial material having a c-axis and phasematching is achieved by arranging the cladding on the fiber so as to guide within the fiber essentially only the resonated lasant radiation having an electrical field polarization generally perpendicular to the c-axis of the uniaxial crystalline material.

In another feature of the present invention, phasematching within the optically nonlinear lasant member is obtained by spatially modulating the nonlinear property of the lasant member with a spatial period generally corresponding to an integer number of coherence lengths along the optical axis of the monolithic optical resonator.

Other features and advantages of the present invention will become apparent upon a perusal of the following specification taken in connecton with the accompanying drawings wherein:

BRIEF DESCRIPTION OF THE DRAWINGS

FIG. 1 is a schematic line diagram, partly in block diagram form, of a laser harmonic generator incorporating features of the present invention, FIG. 2 is a view similar to that of FIG. 1 depicting an alternative embodiment of the present invention, and, FIG. 3 is a view similar to that of FIGS. 1 and 2 depicting an alternative embodiment of the present invention.

DESCRIPTION OF PREFERRED EMBODIMENTS

Referring now to FIG. 1, there is shown a monolithic phasematched laser harmonic generator 11 incorporating features of the present invention, more particularly, a uniaxial, birefringent, optically nonlinear crystal, preferably selected from the group consisting of $LiNbO_3$, $MgO:LiNbO_3$, and $Ba_2NaNb_5O_{15}$, is doped with a lasant ion such as $Nd^{3+}$ to form an optically nonlinear lasant member 12.

Member 12 is optically pumped, in a preferred embodiment, by the output beam of a semiconductor laser diode 13 with the beam being directed along the y-axis of the member 12 and parallel to the optical axis 14 of an optical resonator 15 defined between a pair of mirrors $M_1$ and $M_2$ coated onto polished faces 16 and 17, respectively, of member 12.

Face 16 is concave facing into the optical resonator 15 and is coated with a material so as to be highly reflective at the wavelength of the lasant transition of the lasant $Nd^{3+}$ ion, 1.09 μm and highly transmissive at the wavelength of the pumping radiation, i.e., 780 to 840 nm. Face 17 is flat and highly reflective at the wavelength of the lasant transition and transmissive at the wavelength of the harmonic, such as the second harmonic at 0.545 μm in the green.

Member 12 includes a flat, third polished face 18 disposed on the optical axis 14 of the optical resonator 15. Face 18 is oriented at an angle to the optical axis so as to be totally internally reflective of optical radiation propagating along the optical axis 14. The optical axis 14 of the optical resonator 15 is, over a vast perponderance of its length, parallel to the y-axis of the crystalline material.

The efficiency of the harmonic generation process is greatly increased if the index of refraction for the fundamental wavelength is equal to the index of refraction of the generated harmonic (phasematched). Due to dispersion in the crystalline, nonlinear optical material, the index of refraction is generally greater for the second harmonic than for the fundamental wave energy. However, birefringence is crystals such as $LiNbO_3$ and $Ba_2NaNb_5O_{15}$ allow this dispersive effect to be offset to achieve phasematched operation.

For phasematching operation in both $LiNbO_3$ and $Ba_2NaNb_5O_{15}$ both the direction of propagation and the electric polarization of the fundamental wave are perpendicular to the crystallographic c-axis. However, when $Nd^{3+}$ is doped into these two crystals, the optical lasant gain is higher for the wrong electric polarization of the fundamental, i.e., parallel to the c-axis. Consequently, to force laser operation with a polarization perpendicualr to the c-axis (the correct polarization for phasematched operation) internal reflection from the third or flat face 18 is employed to angularly separate the two polarizations, the desired one of which is resonated. More particularly, for an optical wave polarized perpendicular to the c-axis, the angle of incidence on face 18 is equal to the angle of reflection because after the total internal reflection, the wave sees the same index of refraction as before the reflection. However, for a wave polarized parallel to the c-axis (the wrong polarization for phasematching) the angle of reflection is different from the angle of incidence because the wave sees a different index of refraction after the total internal reflection. This causes angular separation of the two polarizations and the mirror face 17 is tilted so only the wave polarized perpendicular to the c-axis is reflected back along the incident path to form a resonant path of the optical resonator 15. In this manner, laser operation is forced in the correct polarization for phasematched harmonic generation. This technique also works in other materials where the high laser gain polarization is perpendicular to the correct phasematching polarization by choosing the proper angles between the total internally reflective face 18 and the mirror faces 16 and 17.

The pumping radiation need not be applied through the mirror $M_1$ but may be applied through either one of the other faces 18 or 17. Also, the output harmonic radiation may be taken out of the optical resonator 15 through face 16 of the optical resonator 15.

Also, the optically nonlinear laser gain member 12 need not be end pumped as in the case of FIG. 1, but in the alternative, it may be side pumped, i.e., normal to the y-axis.

Referring now to FIGS. 2, there is shown an alternative monolithic phasematched laser harmonic generator embodiment of the present invention. In this embodiment, the optically non-linear lasant member 21 is clad fiber of a birefringent material, selected from the same group as that of the embodiment of FIG. 1, coated on its ends to form mirrors $M_1$ and $M_2$ of an optical resonator 23.

The fiber 21 is clad at 24 with a material having an index of refraction with a graded refractive index which increases in the radial direction r for the polarization of the fundamental which is normal to the c-axis for phasematching but provides no increase in refractive index for the orthogonal polarization, i.e., parallel to the c-axis.

In this manner, the fundamental lasant optical wave energy with the correct polarization for phasematching operation, i.e., electric field polarization perpendicular to the c-axis, is guided along the length of the fiber 21 and resonated within the optical resonator 23, whereas, such optical wave energy polarized parallel to the c-axis (high laser gain polarization but wrong phasematching polarization) is not guided but escapes from the fiber 21, thereby forcing laser operation in the phasematched mode of operation.

In a typical example, the cladding 24 is achieved by diffusing protons into the $Nd:MgO:LiNbO_3$ fiber 21. The fiber 21 is end pumped with optical pumping radiation P preferably from a laser diode pump 13. The generated harmonic output can be taken out of the optical resonator 23 through either one or both of the end mirrors $M_1$ and $M_2$.

Referring now to FIG. 3, there is shown an alternative monolithic laser harmonic generator 25 of the present invention. In this embodiment, the optically nonlinear laser gain member 26 is made of a periodically poled crystal of optically nonlinear material such as $Nd^{3+}$ doped $LiNbO_3$ to obtain quasi-phasematched operation.

The crystal 26 is a ferroelectric material and the nonlinear optical coefficient is associated with the ferroelectric effect and is sptaially modulated, i.e., made of alternating sign as shown by arrows 20, with a spatial period d equal to an odd integer number m of coherence length $l_c$, i.e., $d=(2m+1) l_c$ taken in a direction perpendicular to the c-axis of the crystalline material and parallel to the direction of wave propagation.

Mirrors $M_1$ and $M_2$ are coated onto polished convex faces 27 and 28 of the crystal 26 to define a monolithic optical resonator between the concave faces of the mirrors $M_1$ and $M_2$ with an optical axis 29 perpendicular to the c-axis of the crystal 26. The optical axis 29 is also parallel to the stacking direction of the spatial modulation of the nonlinear optical co-efficient.

In $LiNbO_3$ both the fundamental and harmonic waves are polarized parallel to the c-axis for quasi-phasematching. For $Nd:LiNbO_3$, the high gain polarization is also parallel to the c-axis, therefore, nothing more is required for efficient harmonic generation. The optical axis 29 of the optical resonator and thus the direction of propagation of both fundamental and generated harmonic waves is perpendicular to the c-axis.

Second harmonic generation in periodically poled $LiNbO_3$ crystalline material is taught in an article entitled: "Current induced periodic ferroelectric domain structures in $LiNbO_3$ applied for efficient nonlinear optical frequency mixing", appearing in Appl. Phys. Lett. Vol. 47, No. 11 of Dec. 1, 1985, pgs. 1125–1127.

The crystal 26 is end pumped or side pumped as desired with optical pumping radiation P, preferably obtained from a semiconductor laser diode 13. Second harmonic output is taken out of the optical resonator through either or both of the end mirrors, $M_1$ and $M_2$.

The laser harmonic generator 25 of FIG. 3 is also useful for sub-harmonic generation by dimensioning the period of the spatial modulation of the optical nonlinearity to be an odd integer number of coherence lengths $l_c$ for such parametric sub-harmonic interaction.

As used herein, the terms "phasematched" or "phasematching" as applied to harmonic generation processes, including sub-harmonic generation processes, is defined to include such processes when the indicia of refraction for both the fundamental and harmonic are approximately equal as well as quasi-phasematched processes wherein the optical nonlinearity is spatially modulated to enhance optical, nonlinear mixing.

The advantages to the monolithic phasematched laser harmonic generator of the present invention include simplified construction as only one crystal is employed for both the laser gain medium and optical nonlinear medium. This makes manufacture less costly and gives greater mechanical and thermal stability. In addition, lower intracavity optical losses are achieved which yields higher efficiency.

What is claimed is:

1. In a method for harmonically generating coherent optical radiation, the steps of:
   optically pumping an optically nonlinear lasant material to excite a lasant transition of said nonlinear lasant material;
   reflecting lasant radiation between reflective faces of said lasant material to define a monolithic optical resonator for resonating lasant radiation emanating from said excited lasant transition within said lasant material;
   interacting the resonated lasant radiation within said optically nonlinear lasant material to generate output radiation of a wavelength harmonically related to a wavelength of said resonated lasant radiation; and,
   phasematching the generated harmonic output radiation and the resonated lasant radiation within said lasant material, such that the efficiency of the harmonic generation process is enhanced.

2. The method of claim 1 wherein said optically nonlinear lasant material is crystalline, birefringent and uniaxial having a c-axis, and wherein the step of phasematching the harmonic and resonated lasant radiation includes the step of:
   reflecting the lasant radiation between the reflective faces of said lasant material so as to resonate the lasant radiation having an electric field polarization generally perpendicular to the c-axis of the crystalline material to the exclusion of such radiation polarized parallel to the c-axis.

3. The method of claim 2 wherein one of the reflective faces of said lasant material is generally totally internally reflective of the resonated lasant radiation and including the step of:
   arranging said one internally reflective face relative to other reflective faces of said lasant material which define said optical resonator so that orthogonally polarized waves of lasant radiation are reflected from said one internally reflective face along different paths only one of which represents a resonant path for the lasant radiation between said reflective faces of said defined optical resonator.

4. The method of claim 1 wherein said optically nonlinear lasant material is a fiber of crystalline, birefringent, and uniaxial material having a c-axis, and wherein the step of phasematching the harmonic and resonated lasant radiation includes the step of:
   cladding the fiber so as to guide within the fiber essentially only the resonated lasant radiation having an electric field polarization which is correct for phasematching.

5. The method of claim 4 wherein the step of cladding the fiber includes the step of diffusing into the fiber protons such diffusion causing the index of refraction for the correct polarization of the fundamental to increase while the index of refraction for the orthogonal polarization does not increase.

6. The method of claim 5 wherein the nonlinear lasant material is $Nd:MgO:LiNbO_3$.

7. The method of claim 1 wherein the step of phasematching the generated harmonic and resonated lasant radiation includes the step of:
   spatially modulating the optically nonlinear property of the lasant material with the spatial period generally corresponding to an odd integer number of coherence lengths along an optical axis of the optical resonator for the harmonic generation process.

8. The method of claim 7 wherein the optical nonlinear lasant material is a uniaxial, crystalline material having a c-axis, and wherein the direction of propagation of both the generated harmonic and resonated lasant radiation within said crystalline material is generally perpendicular to the c-axis.

9. The method of claim 8 wherein the optically nonlinear lasant material is ferroelectric having a ferroelectric axis which is spatially modulated with a period generally equal to an odd integer number of coherence lengths to spatially modulate the optical nonlinear property.

10. In a laser optical harmonic generator for generating coherent optical radiation:
an optically nonlinear lasant material;
optical pumping means for optically pumping said nonlinear lasant material to excite a lasant transition of said nonlinear lasant material and for producing lasant radiation;
said optically nonlinear lasant material having reflective faces between which the lasant radiation is reflected to define a monolithic optical resonator for resonating the lasant radiation emanating from said excited lasant transition within said lasant material and for interacting the resonated radiation within said nonlinear lasant material to generate output radiation of a wavelength harmonically related to a wavelength of said resonated lasant radiation; and,
phasematching means for phasematching the generated harmonic output radiation and the resonated lasant radiation within said lasant material, such that the efficiency of the harmonic generation process is increased.

11. The laser harmonic generator of claim 10 wherein said optically nonlinear lasant material is crystalline, birefringent and uniaxial having a c-axis and wherein said phasematching means includes one of said reflective faces of said lasant material which is formed and disposed relative to other reflective faces of said defined optical resonator to resonate the lasant radiation having an electric field polarization generally perpendicular to the c-axis of said crystalline lasant material to the exclusion of such lasant radiation polarized parallel to the c-axis.

12. The laser harmonic generator of claim 11 wherein said one reflective face of said lasant material is generally totally internally reflective of the resonated lasant radiation and is tilted relative to the other reflective faces of said defined optical resonator so that orthogonally polarized waves of lasant radiation are reflected from said one internally reflective face along different paths only one of which represents a resonant path for the lasant radiation between said reflective faces of said defined optical resonator.

13. The laser harmonic generator of claim 10 wherein said optically nonlinear lasant material is a fiber of crystalline, birefringent and uniaxial material having a c-axis; and wherein said phasematching means includes a cladding portion of said fiber, said cladding portion being formed and disposed on said fiber so as to guide within said fiber the resonated lasant radiation having an electric field polarization generally perpendicular to the c-axis of said uniaxial crystalline material to the exclusion of such lasant wave energy having an electric field polarization generally parallel to the c-axis.

14. The laser harmonic generator of claim 13 wherein said cladding comprises an outer portion of said fiber having a higher value of refractive index than an inner core portion of said fiber and wherein said higher refractive index portion of said cladding is characterized in that for the polarization of the fundamental, which is normal to the c-axis, there is an effective increase in index of refraction for phasematching but provides no substantial increase in index of refraction for the polarization parallel to the c-axis.

15. The laser harmonic generator of claims 11 wherein said optical nonlinear lasant material is selected from the group consisting of $Nd:MgO:LiNbO_3$ and $Nd:Ba_2NaNb_5O_{15}$.

16. The laser harmonic generator of claim 10 wherein said phasematching means includes:
spatial modulation of the optical nonlinear property of said lasant material with the spatial period generally corresponding to an odd integer number of coherence lengths along the optical axis of said optical resonator.

17. The laser harmonic generator of claim 16 wherein said optically nonlinear lasant material is a uniaxial, crystalline material having a c-axis; and wherein the direction of propagation of both the generated harmonic and resonated lasant radiation within said crystalline material is generally perpendicular to the c-axis.

18. The laser generator of claim 16 wherein said optical nonlinear lasant material is a ferroelectric material having a ferroelectric axis which is spatially modulated with a period generally equal to an odd integer number of coherence lengths, whereby the nonlinear optical property of said lasant material is spatially modulated.

* * * * *